(12) United States Patent
Huff

(10) Patent No.: US 7,203,174 B2
(45) Date of Patent: Apr. 10, 2007

(54) AUTO DETECTION OF SGMII AND GBIC MODES

(75) Inventor: Gary S Huff, Laguna Hills, CA (US)

(73) Assignee: Broadcom Corporation, Irvine, CA (US)

(*) Notice: Subject to any disclaimer, the term of this patent is extended or adjusted under 35 U.S.C. 154(b) by 1129 days.

(21) Appl. No.: 10/230,159

(22) Filed: Aug. 29, 2002

(65) Prior Publication Data

US 2003/0179710 A1    Sep. 25, 2003

Related U.S. Application Data

(60) Provisional application No. 60/398,588, filed on Jul. 26, 2002, provisional application No. 60/365,806, filed on Mar. 21, 2002.

(51) Int. Cl.
| | |
|---|---|
| H04L 1/00 | (2006.01) |
| H04L 12/26 | (2006.01) |
| H04L 12/50 | (2006.01) |
| H04L 12/28 | (2006.01) |
| H04J 3/14 | (2006.01) |
| H04J 1/16 | (2006.01) |
| H04Q 11/00 | (2006.01) |
| G08C 15/00 | (2006.01) |
| G01R 31/08 | (2006.01) |
| G02B 6/00 | (2006.01) |

(52) U.S. Cl. .................. 370/248; 370/360; 375/129; 375/219

(58) Field of Classification Search ............ 370/248, 370/282, 229, 463, 360, 213, 465, 445, 296, 370/501; 709/250, 203, 253; 375/239; 385/134, 385/139, 147
See application file for complete search history.

(56) References Cited

U.S. PATENT DOCUMENTS

| 6,516,352 B1* | 2/2003 | Booth et al. ............... 709/250 |
|---|---|---|
| 7,054,309 B1* | 5/2006 | Hoot et al. ................ 370/360 |
| 2002/0019954 A1 | 2/2002 | Tran |
| 2002/0023234 A1 | 2/2002 | Berman et al. |
| 2005/0196119 A1* | 9/2005 | Popovic et al. ............. 385/134 |

FOREIGN PATENT DOCUMENTS

| EP | 0 856 975 A2 | 8/1998 |
|---|---|---|
| EP | 0 856 975 A3 | 8/1998 |
| WO | WO 00/59176 | 10/2000 |
| WO | WO 01/47159 A1 | 6/2001 |

OTHER PUBLICATIONS

U.S. Appl. No. 10/230,158, Huff.
U.S. Appl. No. 10/230,160, Huff.
U.S. Appl. No. 10/231,066, Huff et al.
European Search Report from European Patent Application No. 03006502.3, 3 pages, dated Aug. 12, 2003.
U.S. Appl. No. 10/347,295, Huff.
Final/Partial European Search Report for Appln. No. EP 03 00 6504, mailed Sep. 29, 2003, 2 pages.

* cited by examiner

*Primary Examiner*—Chi Pham
*Assistant Examiner*—Prenell Jones
(74) *Attorney, Agent, or Firm*—Sterne, Kessler, Goldstein & Fox P.L.L.C.

(57) ABSTRACT

An Ethernet communication system device that switches between SGMII and GBIC modes of operation, without software intervention. For example, a physical layer device ("PHY") for an Ethernet communication system that switches between SGMII and GBIC modes of operation, without software intervention, to match a link device mode of operation. The link device can be a Media Access Controller ("MAC"), a switch, an optical device, or the like. The PHY is coupled between the link device and a copper link media. The PHY can operate with a link device that has similar SGMII/GBIC switching capabilities. The PHY determines whether the link device is operating in SGMII or GBIC mode of operation. The link device mode of operation is then compared with a current PHY mode of operation. When the PHY mode of operation matches the link device mode of operation, the PHY continues to operate in the current PHY mode. Conversely, when the PHY mode of operation does not match the link device mode of operation, the PHY mode of operation is changed. The PHY mode of operation can be toggled between SGMII and GBIC. Alternatively, the PHY mode of operation is changed randomly or semi-randomly, to insure that the PHY will connect with a link partner that has similar SGMII/GBIC switching capabilities. The PHY mode of operation can be changed, for example, under control of a linear feedback shift register. After the PHY mode of operation has been changed, the process is repeated until the PHY mode of operation matches the link device mode of operation. The process can be implemented as part of an auto-negotiation process between the PHY and the link device. The auto-negotiation process is preferably implemented in accordance with IEEE 802.3, clause 37, or a modified version thereof.

25 Claims, 4 Drawing Sheets

AUTO DETECTION OF SGMII AND GBIC MODES

CROSS-REFERENCE TO RELATED APPLICATIONS

This patent application claims priority to U.S. provisional application No. 60/398,588, titled, "Auto Detection of SGMII and GBIC Modes," filed Jul. 26, 2002, and to U.S. provisional application No. 60/365,806, titled, "Gigabit Ethernet Transceiver," filed Mar. 21, 2002, both of which are incorporated herein by reference in their entirety.

BACKGROUND OF THE INVENTION

1. Field of the Invention

The present invention is directed to Ethernet communication systems and, more particularly, to Ethernet physical layer devices.

2. Related Art

Ethernet is a widely used technology in local area networks ("LAN") and other computer networks. The Institute for Electrical and Electronics Engineers ("IEEE") has developed standards for Ethernet communication systems. See, for example, IEEE 802.3, incorporated herein by reference in its entirety. The IEEE 802.3 standards have been adopted by the International Organization for Standardization ("ISO"), making the IEEE 802.3 standards worldwide standards.

In an Ethernet network, a computer utilizes an Ethernet transceiver to transmit and receive signals between the computer and another device. The transceiver typically interfaces with the other device via a physical link medium, such as copper or fiber.

An Ethernet transceiver typically includes a media access controller ("MAC") that interfaces with applications running on the computer. Alternatively, an Ethernet module can include a switch or an optical module. An Ethernet transceiver also includes a physical layer device, or "PHY" that interfaces between the MAC/switch and a physical link media, such as a copper link media. PHYs typically interface with physical link media using data streams. PHYs typically interface with MACs/switches using packet-based interfaces. PHYs have to operate in the same mode as their corresponding MACs. Of interest here are a serial gigabit media independent interface ("SGMII") mode and a gigabit interface converter ("GBIC") mode.

What is needed is a PHY that supports both SGMII and GBIC modes of operation, and that interfaces with copper link media. What is also needed is a PHY that detects a mode of operation of a MAC/switch and that switches between SGMII and GBIC modes, without software intervention, to match the MAC/switch mode of operation.

BRIEF SUMMARY OF THE INVENTION

The present invention is directed to Ethernet communication system devices that can detect and switch between SGMII and GBIC modes of operation, without software intervention. The present invention is described herein as implemented within a a physical layer device ("PHY") for an Ethernet communication system that can detect and switch between SGMII and GBIC modes of operation, without software intervention, to match a mode of a link device. The link device can be a Media Access Controller ("MAC"), a switch, an optical device, or the like. The PHY is coupled between the link device and a copper link media.

The PHY can function with a link device that has similar SGMII/GBIC switching capabilities. The invention is not, however, limited to implementation in a PHY. Based on the description herein, one skilled in the relevant art(s) will understand that the invention can be implemented within a switch, a MAC, and/or in other suitable Ethernet communication system devices.

The PHY detects whether the link device is operating in SGMII or GBIC mode of operation. The PHY can, for example, read a mode selector bit from a base page link code word received from the link device during an auto-negotiation process.

The link device mode of operation is then compared with a PHY mode of operation. When the PHY mode of operation matches the link device mode of operation, the PHY continues to operate in the current PHY mode. Conversely, when the PHY mode of operation does not match the link device mode of operation, the PHY mode of operation is changed.

The PHY mode of operation can changed by toggling between SGMII and GBIC modes. Alternatively, the PHY mode of operation is changed randomly or semi-randomly. Random or semi-random changes helps to insure that the PHY will connect with a link partner that has similar SGMII/GBIC switching capabilities. Random or semi-random mode changes can be performed with, for example, a linear feedback shift register. After the PHY mode of operation is changed, the process is repeated in order to determine if the PHY mode of operation matches the link device mode of operation.

The process can be implemented as part of an auto-negotiation process between the PHY and the link device. The auto-negotiate process performed between the PHY and the link device is preferably implemented in accordance with IEEE 802.3, clause 37, or a modified version thereof A copper auto-negotiate process performed between the PHY and the copper link is preferably performed in accordance with IEEE 802.3, copper auto-negotiate clauses 28 and 40. The copper auto-negotiation process can include, for example, masking advertising of 10 and 100 speed capability when the PHY is in GBIC mode.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE FIGURES

The present invention will be described with reference to the accompanying drawings. The drawing in which an element first appears is typically indicated by the leftmost digit(s) in the corresponding reference number.

DETAILED DESCRIPTION OF THE INVENTION

TABLE OF CONTENTS

I. Introduction
II. Copper PHY with SGMII and GBIC Mode Functionality
   A. Detecting a MAC/Switch Mode of Operation
   B. Matching the PHY Mode of Operation with the MAC/Switch Mode of Operation
   C. SGMII Mode
   D. Method of Detecting a Link Device Mode of Operation and Matching a PHY Mode of Operation with the MAC/Switch Mode of
   Operation
III. Conclusion I. Introduction Conventional PHYs and MACs interface with one another through a Media Independent Interface "(MII") or Gigabit MII ("GMII"). MII and GMII standards are defined in, for example, IEEE 802.3. GMII/MII support three speeds, 10, 100, and 1000 Gigabaud ("Gbaud"). GMII typically involves at least 22 pins, including, for example, 8 transmit and 8 receive data pins.

In order to reduce the pin count to save board space, cost, and interconnecting to other chips, new differential serial interfaces have been developed, including serial GMII ("SGMII") and gigabit interface converter ("GBIC") interfaces. GBIC does not require a separate clock pin. Instead, a clock signal is recovered from the data. GBIC has only one speed, 1000 Gbaud, and thus, is not backwardly compatible with 10/100 speed systems. SGMII is similar to GBIC, except that SGMII includes a separate clock pin and supports 10/100/1000 speeds. On the MAC side, SGMII and GBIC interface with MACs/switches serially, rather than parallel. On the physical link side, SGMII and GBIC can be used to interface with copper physical links.

In most SGMII applications, the PHY is attached to the MAC on the same board and can be programmed to operate in a desired speed/duplex. The PHY and the MAC generally do not perform a resolution on the desired speed and duplex settings. Rather, the PHY acts as the master. In most GBIC applications, however, the PHY is located on a luggable GBIC card with a 20-pin interface. The interface only supports a differential pair of signals in each direction with no software support. A drawback of conventional Ethernet transceivers is that separate designs are needed to support GBIC and SGMII.

Accordingly, the present invention is directed to an Ethernet transceiver physical layer device ("PHY") that includes both Serial Gigabit Media Independent Interface ("SGMII") and Gigabit Interface Converter ("GBIC") capability. The invention determines whether a PHY link partner (e.g., a MAC or a switch) is operating in SGMII or GBIC mode. The invention changes the PHY mode of operation as needed, optionally including copper auto-negotiation abilities, without software intervention. The invention can function with a link device that can also switch between SMGII and GBIC modes.

Figure 1A:
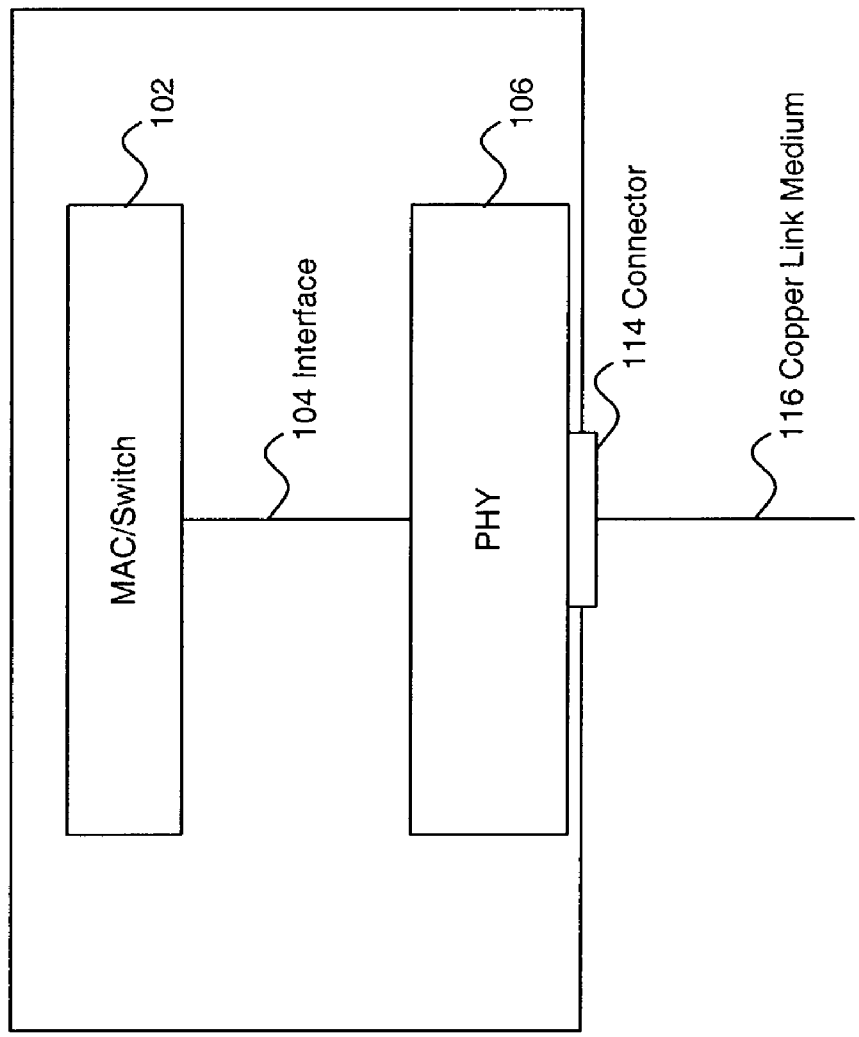
FIG. 1A is a block diagram of an Ethernet transceiver 100, wherein a MAC/switch 102 interfaces with a PHY 106 via a serial interface 104.

FIG. 1A is a block diagram of an Ethernet transceiver, or module 100, wherein a MAC/switch 102 interfaces with a PHY 106 via a serial interface 104. The serial interface 104 can be a SGMII or a GBIC serial interface, as described below. The PHY 106 is coupled to a copper link media 116 (e.g., four twisted pairs) by a connector 114.

On the MAC/Switch 102 side, the PHY 106 receives transmit signals from the MAC/switch102. The PHY 106 decodes the transmit signals to recover the transmitted data. The recovered data is then sent out on the copper link media 116. On the copper link 116 side, the PHY 106 receives data from the copper link 116, encodes or packetizes it, and sends it to the MAC/switch 102.

Figure 1B:
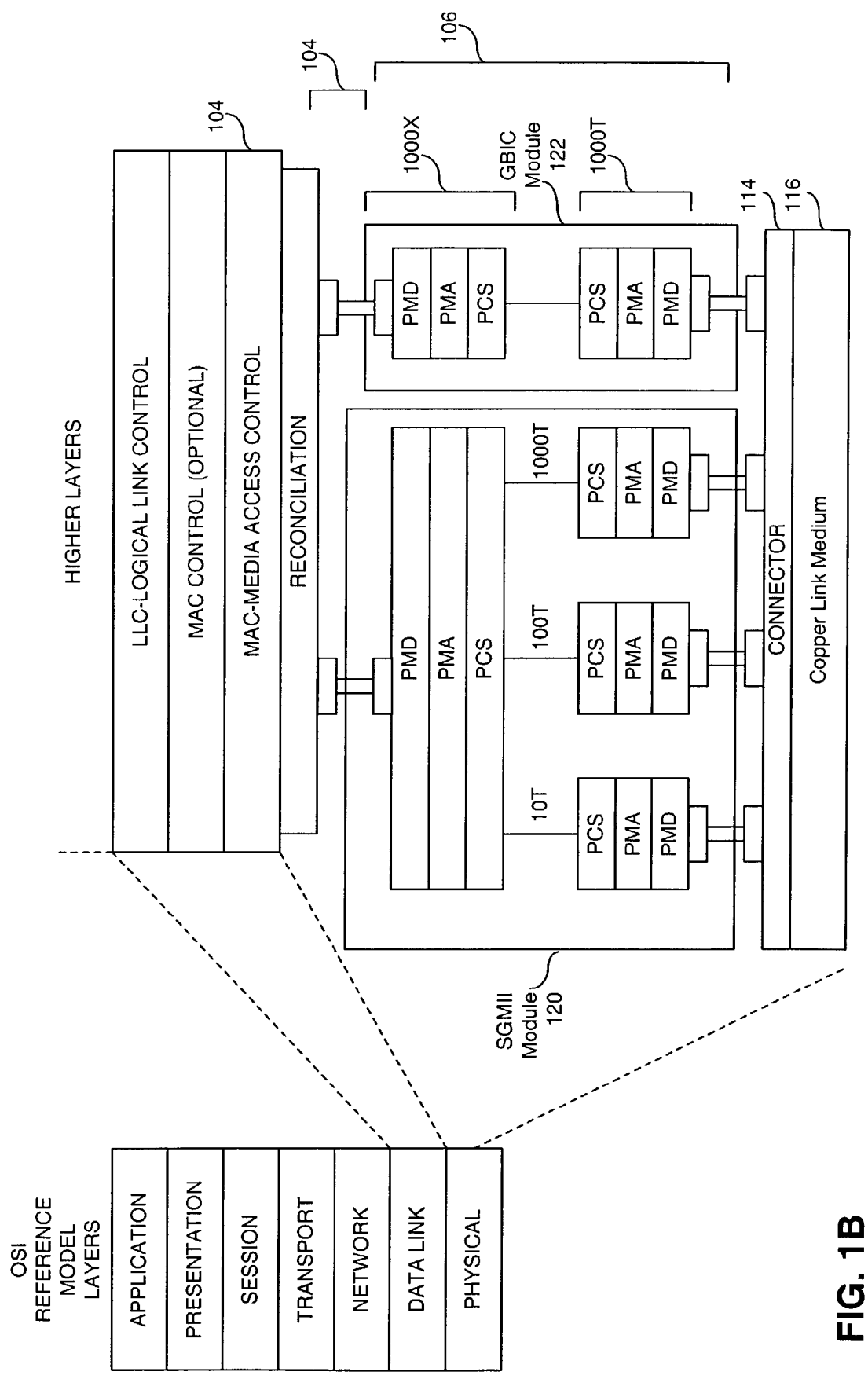
FIG. 1B is a detailed block diagram of the Ethernet module 100.

FIG. 1B is a detailed block diagram of an example embodiment of the Ethernet module 100, wherein the PHY 106 includes an SGMII module 120 and a GBIC module 122. The SGMII module 120 and the GBIC module 122 include physical coding sub-layers ("PCSs"), physical medium attachment sub-layers ("PMAs"), and physical medium dependent sub-layers ("PMDs"). Functions and operations of the PCSs, PMAs, and PMDs are well known to those skilled in the relevant art(s).

The example Ethernet module 100 illustrated in FIGS. 1A and 1B is provided for illustrative purposes. The present invention is not limited to the examples illustrated in FIGS. 1A and 1B. Based on the description herein, one skilled in the relevant art(s) will understand that the invention can be implemented in other types of Ethernet modules as well.

II. Copper PHY with SGMII and GBIC Mode Functionality

In accordance with the invention, the PHY 106 includes both SGMII and GBIC functionality. The PHY 106 determines whether the MAC/switch 102 is operating in SGMII or GBIC mode. The PHY mode of operation is changed, as needed, without software intervention, to match the mode of the MAC/switch 102. The PHY 106 can operate with a link device having similar switching abilities.

Figure 2:
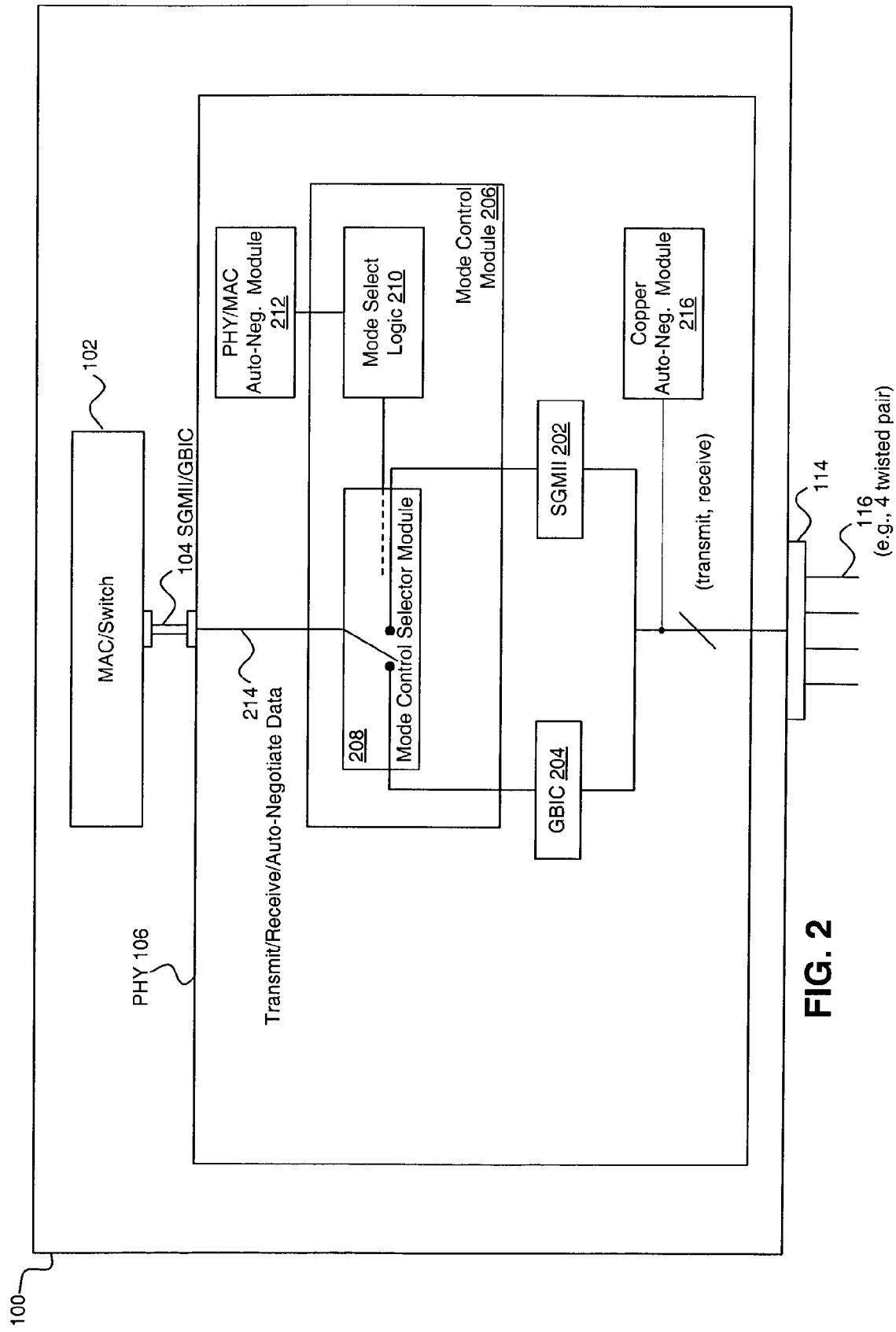
FIG. 2 is a block diagram of the Ethernet transceiver 100, wherein the serial PHY 106 includes a SGMII module 202, a GBIC module 204, a mode control module 206, a PHY/MAC auto-negotiate module 212, and a copper auto-negotiate module 216.

FIG. 2 is a block diagram of the Ethernet transceiver 100, wherein the PHY 106 includes a SGMII module 202, a GBIC module 204 a mode control module 206, a PHY/MAC auto-negotiate module 212, and a copper auto-negotiate module 216. The SGMII module 202 can include one or more of the features illustrated in the SGMII module 120 in FIG. 1B. Similarly, the GBIC module 204 can include one or more of the features illustrated in the GBIC module 122 in FIG. 1B.

The mode control module 206 selectively interfaces the MAC/switch 102 with either the SGMII module 202 or the GBIC module 204. In the example of FIG. 2, the mode control module 206 is functionally illustrated with a mode control selector module 208, which is controlled by mode select logic 210. This functionality can be implemented in a variety of ways, including logic and/or imbedded software.

The PHY/MAC auto-negotiate module 212 is coupled to an electrical connection 214. The electrical connection 214 carries transmit, receive, and auto-negotiate data between the MAC/switch102 and the mode control module 206. The PHY/MAC auto-negotiate module 212 generally follows IEEE 802.3, clause 37. GBIC mode has only one speed, 1000. In GBIC mode, therefore, the PHY/MAC auto-negotiate module 212 does not need to provide operating speed capabilities to the MAC/switch 102. For SGMII mode, however, the auto-negotiate module 212 sends the operating speed, duplex, and link information from the PHY 106 to the MAC/switch 102, as described below This allows the MAC/switch 102 and/or the PHY 106 to replicate the data 10 times when the speed is 100, and 100 times when the speed is 10, as described below. The MAC/switch 102 and/or the PHY

106 perform this replication because the clock rate between the PHY 106 and the MAC/switch 102 typically remains fixed for all speeds.

The copper auto-negotiate module 216 is coupled to the copper link 116. The copper auto-negotiate module 216 generally follows IEEE 802.3, clauses 28 and 40.

A. Detecting a MAC/Switch Mode of Operation

Detection of a MAC/switch 102 mode of operation is now described. The PHY 106 and the MAC/switch 102 link with one another by exchanging base page link code words during auto-negotiation. The mode select logic 210 reads the base page link code word that is received from the MAC/switch 102 through the auto-negotiation module 212. Typically, after the PHY 106 receives the base page link code word from the MAC/switch 102, the PHY 106 typically sets a "page received bit" as it enters a "complete acknowledge state."

The base page link code word from the MAC/switch 102 includes a mode selector bit. When the mode selector bit is set, the MAC/switch 102 is operating in SGMII mode. The mode select logic 210, within the mode control module 206, reads the mode selector bit from the base page link code word received from the MAC/switch102. The mode select logic 210 compares the mode selector bit from the MAC/switch 102 with a current mode of operation of the PHY 106. Functionally speaking, the mode select logic 210 compares the mode selector bit from the MAC/switch 102 to the current state of the mode control selector module 208.

When the modes of the MAC/switch 102 and the PHY 106 match, then the MAC/switch 102 and the PHY 106 are operating in the same mode. In this case, the mode select logic leaves the mode control selector module 208 as is. When the states of the MAC/switch 102 and the PHY 106 do not match, the mode select logic 210 declares a mismatch.

B. Matching the PHY Mode of Operation with the MAC/Switch Mode of Operation

Matching the PHY 106 mode of operation to the MAC/switch 102 mode of operation is now described. In the event of a mismatch, the mode select logic 210 can toggle the mode control selector 208 from SGMII mode to GBIC mode and vice versa. Alternatively, the mode select logic 210 randomly or semi-randomly controls the state of the mode control selector 208. This is useful where, for example, the MAC/switch 102 includes an ability to change modes as well. In such a case, if the PHY 106 and the MAC/switch simply toggle from one state to another, they could continuously encounter mode mismatches. By randomly or semi-randomly controlling at least the mode control selector 208, the mode of the PHY 106 will eventually match the mode of the MAC/switch 102.

The mode select logic 210 can randomly or semi-randomly control the mode control selector 208 in one or more of a variety of ways. For example, the mode select logic 210 can include a linear feedback shift register ("LFSR") that is seeded with values when the PHY 106 attempts to link with the MAC/switch 102. LFSRs and LFSR seeding are well known to those skilled in the relevant art(s). Where multiple devices include an ability to switch between SGMII and GMII modes, and where the multiple devices utilize LFSRs, the seeding of the LFSRs should be unique to each device since the devices could be attached by a fiber cable or other media that can be removed and/or attached without powering down the device.

An LFSR in the mode select logic 210 can be, for example, a 13 bit LFSR. An example implementation of a 13 bit LFSR is now described. The LFSR is reloaded on the first and every subsequent 13 mismatches. The LFSR is advanced after each mismatch. The LFSR is then loaded with the following 13 bits based on the current mode. When SGMII mode is active, the LFSR is seeded as: random [4:0] and 53 h. When GBIC mode is active, the LFSR is seeded as: random [4:0] and Cah. The seeding of the LFSR is different between SGMII and GBIC in order to allow similar devices or a device with no auto-detection to link up on the next try. The random seeding uses a slow ramping analog delay line to latch another free running LFSR. This allows all devices to link up in a finite amount of time, regardless of plugging and unplugging of devices, modes, and initial LFSR seed matching between devices.

Random and semi-random mode selection is not, however, limited to LFSRs. One skilled in the relevant art(s) will understand that other methods and systems for randomly and/or semi-randomly changing the PHY 106 mode of operation to match the MAC/switch 102 mode of operation can be used.

When switching between SGMII and GBIC modes, the copper auto-negotiation abilities within the PHY/MAC auto-negotiate module 216, based on clause 28 and 40 of IEEE 802.3, can be modified to account for differences between SGMII and GBIC. For example, the 10/100 abilities advertised on the copper side in SGMII can be masked out in GBIC mode.

C. SGMII Mode

An example implementation of the SGMII module 202 is now described. The SGMII module 202 uses 2 data signals and 1 clock signal to convey frame data and link rate information between the PHY 106 and the MAC/switch 102. The data signals operate at 1.25 Gigabaud, and the clocks operate at 625 MHz, double data rate ("DDR"). DDR utilizes both rising and falling edges of the clock signal. The signals are preferably implemented as differential pairs to improve signal integrity and minimizing system noise.

When the MAC/switch 102 operates below 1000 speed (e.g., 10 Mbps or 100 Mbps), the PHY 106 elongates a frame by replicating each frame byte 10 times for 100 Mbps and 100 times for 10 Mbps. This frame elongation typically takes place above the PCS layer (e.g., PCS 108 in FIG. 1B), in accordance with IEEE 802.3z, so that a start frame delimiter appears only once per frame.

At the receive side, the PHY 106 passes the signals from the copper link 116 through the PCS 108 (FIG. 1B). The PHY 106 serializes the PCS 108 data to create an SBOUT± pin signal pair, and sends it to the MAC/switch 102 at 1.25 Gbps data rate, for example, along with the 625 MHz, for example, DDR SCLK± pin signal pair.

At the transmit, the PHY 106 deserializes data received from the MAC/switch 102 at the SGIN± pin to recover encoded parallel data. The PHY 106 passes parallel data through a receive state machine within the PCS 108 (FIG. 1B), to recover the transmit signals. The decoded transmit signals are passed through a transmit block and are output to the copper link 116 with predetermined speed, or symbol rate.

When the PHY 106 detects a link change with the copper link partner, the PHY 106 starts an auto-negotiation process with the MAC/switch 102 and sends updated control information to the MAC/switch 102. The SGMII module 202 uses the PHY/MAC auto-negotiation module 212 to pass control information to the MAC/switch 102, to notify the MAC/switch 102 of the change in link status. The MAC/switch 102 receives and decodes control information and starts the auto-negotiation process.

Figure 3:
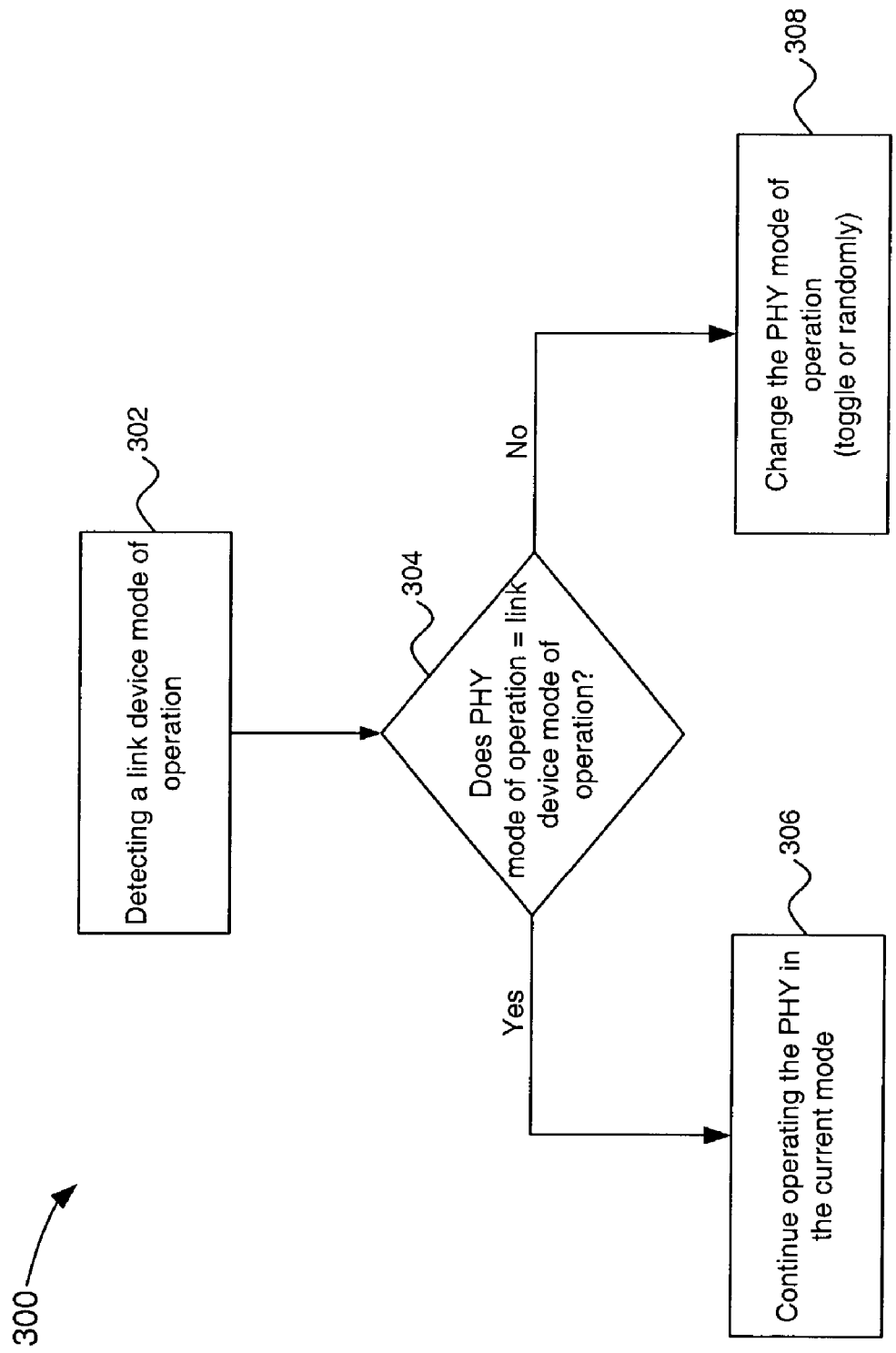
FIG. 3 is a process flowchart 300 for detecting a MAC/switch mode of operation, and for switching a corresponding PHY mode of operation to match the MAC/switch mode of operation.

D. Method of Detecting a MAC/Switch Mode of Operation and Matching a PHY Mode of Operation with the MAC/Switch Mode of Operation In FIG. 3 is a process flowchart 300 for implementing the present invention. For exemplary purposes, the process flowchart 300 is described below with reference to one or more of the example system implementations described above. The present invention is not, however, limited to the example system implementations described above. Based on the description herein, one skilled in the relevant art(s) will understand that the process flowchart 300 can be implemented with other system implementations as well. Such other implementations are within the spirit and scope of the present invention.

The process flowchart 300 provides a method for detecting a link device mode of operation, and for switching a PHY mode of operation to match the link device mode of operation. The PHY is coupled between the link device and a copper link media. The link device can be a MAC, a switch, an optical device, or the like.

The process begins with step 302, which includes detecting a link mode of operation. Step 302 can include, for example, detecting whether the link device is operating in SGMII or GBIC mode of operation. Step 302 can be performed by reading a mode selector bit from a base page link code word received from the link device. This can be part of the auto-negotiation process performed by the PHY/MAC auto-negotiation module 212 in FIG. 2.

Step 304 includes comparing the link device mode of operation with a current PHY mode of operation. In the example of FIG. 2, this is performed by the mode select logic 210. When the PHY mode of operation matches the link device mode of operation, processing proceeds to step 306, where the PHY continues to operate in the current mode.

Conversely, when the PHY mode of operation does not match the link device mode of operation, processing proceeds to step 308, which includes changing the PHY mode of operation. In the example of FIG. 2, the PHY mode of operation is changed by the mode control selector module 208 under control of the mode select logic 210. For example, the PHY mode of operation can be toggled between SGMII and GBIC. Alternatively, the PHY mode of operation is changed randomly or semi-randomly, to insure that the PHY will connect with a link partner that has similar SGMII/GBIC switching capabilities. The PHY mode of operation can be changed, for example, under control of a linear feedback shift register, as described above.

After the PHY mode of operation has been changed, processing returns to step 302 in order to determine if the new PHY mode of operation matches the link device mode of operation.

The process flowchart 300 is preferably implemented as part of a PRY/MAC auto-negotiate process between the PHY and the link device. The auto-negotiate process is preferably implemented in accordance with IEEE 802.3, clause 37. For SGMII mode, the PRY/MAC auto-negotiate process can include sending the operating speed, duplex, and link information from the PHY to the link device (e.g., MAC/switch). A copper auto-negotiate process can also be performed between the PHY and the copper link, in accordance with IEEE 802.3, clauses 28 and 40, or modified versions thereof. The copper auto-negotiate can include masking advertising of 10 and 100 speed capability when the PHY is in GBIC mode.

III. Conclusion

The present invention has been described above with the aid of functional building blocks illustrating the performance of specified functions and relationships thereof. The boundaries of these functional building blocks have been arbitrarily defined herein for the convenience of the description. Alternate boundaries can be defined so long as the specified functions and relationships thereof are appropriately performed. Any such alternate boundaries are thus within the scope and spirit of the claimed invention. One skilled in the art will recognize that these functional building blocks can be implemented by discrete components, application specific integrated circuits, processors executing appropriate software, and the like, and/or combinations thereof.

When used herein, the terms "connected" and/or "coupled" are generally used to refer to electrical connections. Such electrical connections can be direct electrical connections with no intervening components, and/or indirect electrical connections through one or more components.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for detecting a link device mode of operation and for changing a physical layer device ("PHY") mode of operation to match the link device mode of operation, wherein the PHY is coupled between the link device and a copper link media, comprising:
   (1) determining whether the link device mode of operation is a Serial Gigabit Media Independent Interface ("SGMII") mode of operation or a Gigabit Interface Connector ("GBIC") modes of operation;
   (2) comparing the link device mode of operation with a PHY mode of operation;
   (3) changing the PHY mode of operation when the link device mode of operation is different than the PHY mode of operation; and
   (4) repeating steps (1) through (3) until the link device mode of operation and the PHY mode of operation match one another.

2. The method according to claim 1, wherein step (1) comprises:
   (a) receiving a base page link code word from the link device; and
   (b) reading a mode selector bit from the link device base page link code word;
      wherein step (2) comprises comparing the link device mode selector bit with the PHY mode of operation.

3. The method according to claim 1, wherein step (3) comprises randomly changing the PHY mode of operation when the link device mode of operation is different than the PHY mode of operation.

4. The method according to claim 3, wherein step (3) further comprises randomly changing the PHY mode of operation under control of a linear feedback shift register ("LFSR").

5. The method according to claim 4, wherein step (3) further comprises seeding the LFSR with initial values when the PHY attempts to link with the link device.

6. The method according to claim 3, wherein step (3) further comprises randomly changing the PHY mode of operation with a 13 bit LFSR.

7. The method according to claim 6, wherein step (3) further comprises seeding the 13 bit linear feedback register ("LFSR").

8. The method according to claim 7, wherein step (3) further comprises:
(a) reloading the 13 bit LFSR when the link device mode of operation is first determined to be different than the PHY mode of operation; and
(b) advancing the 13 bit LFSR normally for up to twelve subsequent mismatches; and
(c) reloading the 13 bit LFSR on a thirteenth mismatch, and on multiples thereof.

9. The method according to claim 7, wherein step (3) further comprises seeding the 13 bit LFSR as random [4:0] and 53 h, when the current PHY mode of operation is SGMII.

10. The method according to claim 7, wherein step (3) further comprises seeding the 13 bit LFSR as random [4:0] and Cah, when the current PHY mode of operation is GBIC.

11. The method according to claim 4, wherein step (3) further comprises randomly seeding the LFSR with a slow ramping analog delay.

12. The method according to claim 7, wherein step (3) further comprises randomly seeding the 13 bit LFSR with a slow ramping analog delay.

13. The method according to claim 1, further comprising auto-negotiating between the PHY and the link device in accordance with a modified version of IEEE 802.3, clause 37.

14. The method according to claim 13, further comprising masking advertising of PHY SGMII copper 10 and 100 speed capability when the PHY is in GBIC mode.

15. The method according to claim 13, further comprising sending operating speed, duplex, and link information from the PHY to the link device when the PHY is in SGMII mode.

16. The method according to claim 13, further comprising:
(a) masking advertising of PHY SGMII copper 10 and 100 speed capability when the PHY is in GBIC mode; and
(b) sending operating speed, duplex, and link information from the PHY to the link device when the PHY is in SGMII mode.

17. The method according to claim 1, wherein step (3) comprises toggling the PHY mode of operation when the link device mode of operation is different than the current PHY mode of operation.

18. The method according to claim 1, wherein the link device is a media access controller.

19. The method according to claim 1, wherein the link device is an Ethernet switch.

20. The method according to claim 1, wherein the link device is an optical device.

21. An Ethernet Physical Layer Device ("PHY") that switches between Serial Gigabit Media Independent Interface ("SGMII") and Gigabit Interface Connector ("GBIC") modes of operation to match a mode of operation of a link device coupled thereto, wherein the PHY is coupled between the link device and a copper link media, comprising:
means for determining whether the link device is operating in SGMII or GBIC mode of operation;
means for comparing the link device mode of operation with a PHY mode of operation; and
means for changing the PHY mode of operation when the link device mode of operation is different than the PHY mode of operation.

22. An Ethernet Physical Layer Device ("PHY") that switches between Serial Gigabit Media Independent Interface ("SGMII") and Gigabit Interface Connector ("GBIC") modes of operation to match a mode of operation of a link device coupled thereto, wherein the PHY is coupled between the link device and a copper link media, comprising:
a link device interface port including a transmit pin, a receive pin, and a clock pin;
a PHY/MAC auto-negotiate module coupled to the link device interface port;
a mode control module coupled to the link device interface port, the mode control module including mode control logic and a mode control selector module;
a SGMII module coupled to the mode selector module;
a GBIC module coupled to the mode selector module;
whereby the mode control logic interfaces with the PHY/MAC auto-negotiate module to determine a link device mode of operation;
whereby the mode control logic compares the link device mode of operation with a PHY mode of operation;
whereby the mode control logic controls the mode control selector module to couple the link device interface port with the GBIC module or the SGMII module so that the PHY mode of operation matches the link device mode of operation.

23. The apparatus according to claim 22, further comprising a copper auto-negotiate module coupled to the copper link media, wherein the copper auto-negotiate module masks advertising of PHY SGMII copper 10 and 100 speed capability when the mode control selector module couples the link device interface port with the GBIC module.

24. The apparatus according to claim 22, wherein the PHY/MAC auto-negotiate module sends operating speed, duplex, and link information to the link device when the mode control selector module couples the link device interface port with the SGMII module.

25. A method for detecting a physical layer device ("PHY") mode of operation and for changing a link device mode of operation to match the PHY mode of operation, wherein the PHY is coupled between the link device and a copper link media or a fiber link media, comprising:
(1) determining whether the PHY mode of operation is a Serial Gigabit Media Independent Interface ("SGMII") mode of operation or a 1000-X mode of operation;
(2) comparing the PHY device mode of operation with a link mode of operation;
(3) changing the link mode of operation when the PHY mode of operation is different than the link device mode of operation; and
(4) repeating steps (1) through (3) until the PHY mode of operation and the link device mode of operation match one another.

* * * * *